Nov. 19, 1968  J. C. GRANT  3,411,278

DOFFER FOR COTTON HARVESTERS

Filed April 25, 1966  4 Sheets-Sheet 1

INVENTOR.
JOHN C. GRANT
BY John O. Evans, Jr.
ATTORNEY

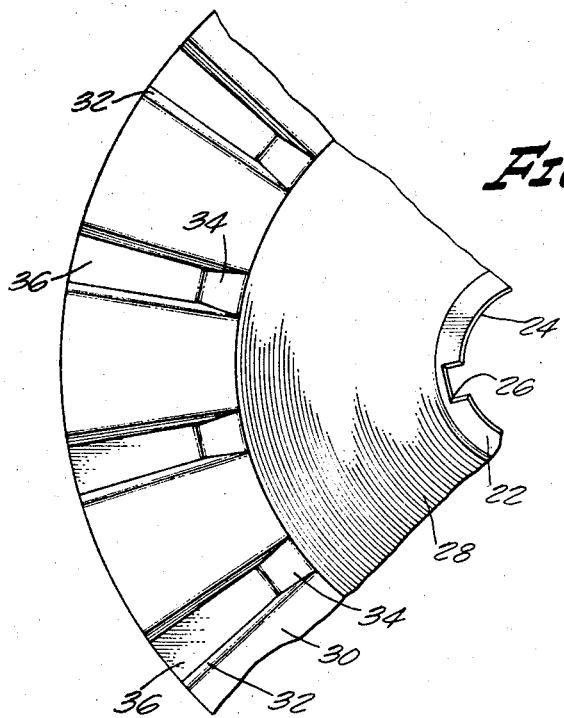
FIG. 3.
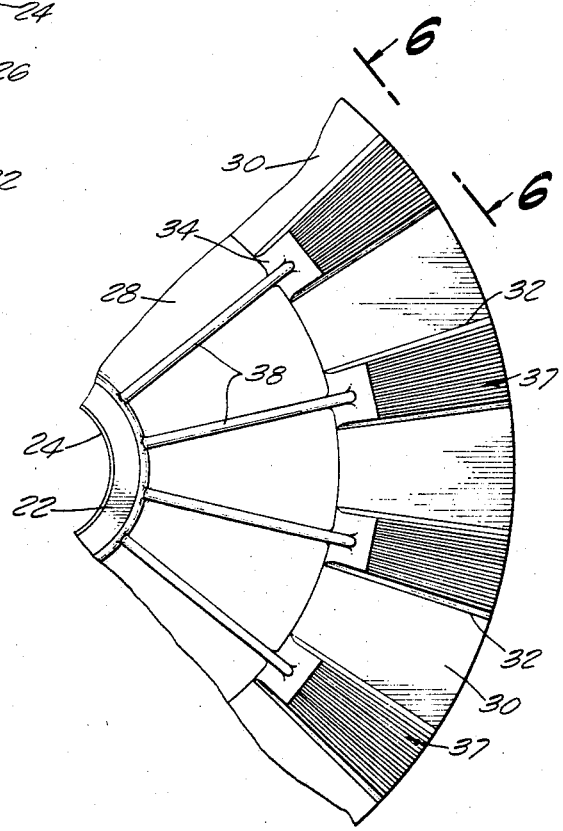
FIG. 5.
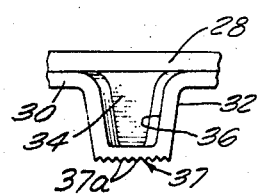
FIG. 4.
FIG. 6.
INVENTOR.
JOHN C. GRANT
BY John O. Evans, Jr.
ATTORNEY Nov. 19, 1968         J. C. GRANT         3,411,278
DOFFER FOR COTTON HARVESTERS
Filed April 25, 1966                4 Sheets-Sheet 3

INVENTOR.
JOHN C. GRANT
BY John O. Evans, Jr.
ATTORNEY

Nov. 19, 1968
J. C. GRANT
3,411,278
DOFFER FOR COTTON HARVESTERS
Filed April 25, 1966
4 Sheets-Sheet 4
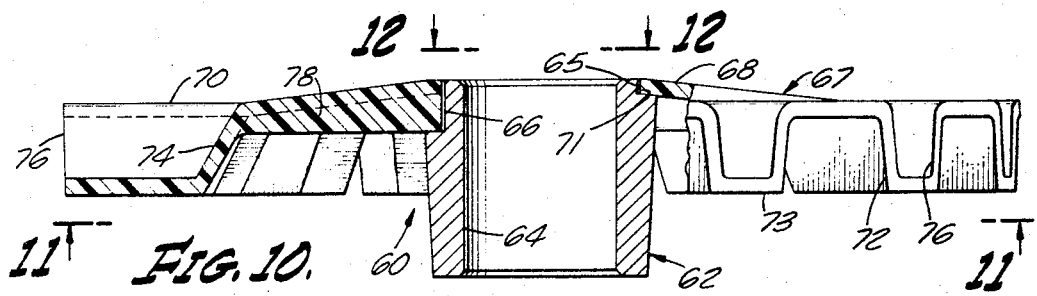
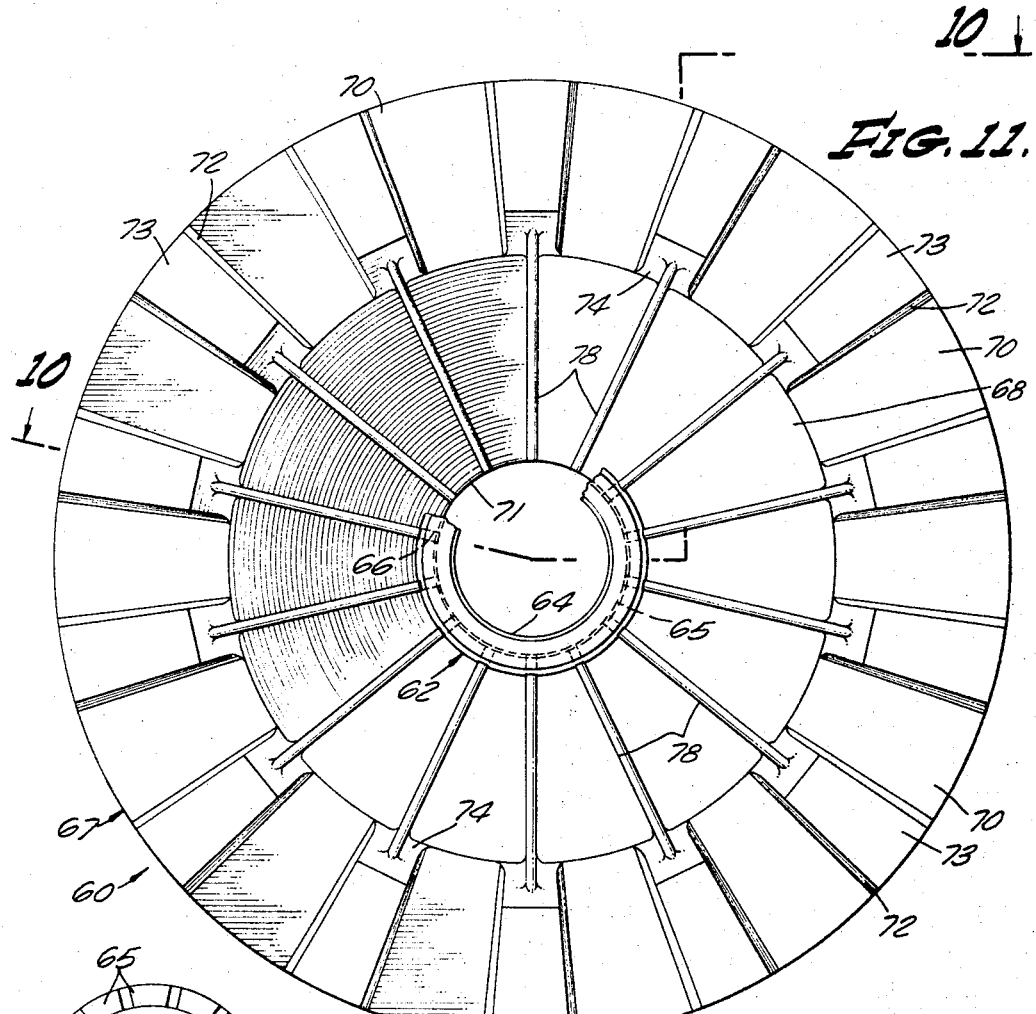
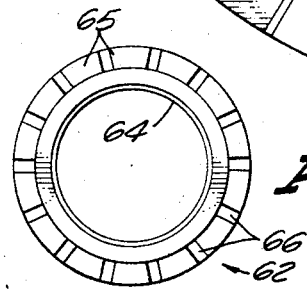
INVENTOR.
JOHN C. GRANT
BY John O. Evans, Jr.
ATTORNEY United States Patent Office 3,411,278
Patented Nov. 19, 1968

3,411,278
DOFFER FOR COTTON HARVESTERS
John C. Grant, Huntington Park, Calif., assignor to Byron Jackson Inc., Long Beach, Calif., a corporation of Delaware
Filed Apr. 25, 1966, Ser. No. 544,916
8 Claims. (Cl. 56—41)

This invention relates to machines for harvesting cotton, and particularly to doffers for removing the cotton fibres from the picking spindles.

The more common types of cotton harvesters travel between the rows of ripe cotton plants, the branches containing the cotton bolls being gathered through a passage in the machine between vertically-spaced rows of rotating picking spindles in the form of barbed fingers, which penetrate the cotton bolls, the cotton fibres becoming wrapped around the spindles. As the spindle is retracted it moves in a horizontal plane across the doffing surface at the bottom of a doffer, which, traveling at a faster surface speed than that of the spindle, unwinds and removes the cotton from the spindle, allowing the cotton fibres to be sucked into a collecting hopper by a draft of air, the spindle then continuing its cycle to extract additional cotton to be doffed and collected.

The usual doffers are made of a circular metal disc or plate with a central hub for mounting on a power-driven, vertical, rotating shaft, a number of them being clamped onto each shaft to form a drum or battery of doffers, the hubs providing equal spacing. In the harvester, a battery of doffers is disposed on either side of the passage through which the rows of cotton plants are gathered and pass, with corresponding drums of spindles adjacent the drums of doffers. To provide flexibility and yieldable resistance to shock, the metal doffer supporting plates each generally have bonded thereto near the outer periphery a rubber-like ring formed with a series of axially protruding lugs defining doffing surfaces functioning to contact the cotton. Because of frequently encountered unopened or green cotton bolls, sticks, rocks, and other debris, in addition to normal wear, the rubber becomes worn or abraded and therefore requires frequent replacement. This involves removing the worn doffers, returning the same to the factory for re-rubbering the metal support, with the attendant costly down-time.

It is therefore a primary object of this invention to provide an improved doffer of general disc-like configuration of unitary rubber-like material with integral doffing lugs, and having optimum flexibility in the axial direction from the hub to its outer periphery, as distinguished from metal reinforcing plates having rubber or rubber-like doffer protuberances added and bonded thereto to a metal reinforcing member.

Another object of the invention is to provide an improved doffer having a relatively uniform thickness and of unitary material, with resultant optimum yieldable resistance at all doffing or cotton-engaging surfaces.

An additional object of the invention is to provide an improved doffer unit, with unique doffing cotton engaging means which provides optimum yieldable resistance to thus effectively grab and doff the cotton, and incorporating sufficient flexibility to avoid overstressing.

A further object of the invention is to provide an improved doffer unit, having webs which are reinforced at each doffing lug with ribs of the same uniform material as that of the main body of the doffer to thus provide the optimum value of yieldable resilience, and hence optimum doffing action.

A still further object of this invention is to provide an improved doffer having a rubber plate-like inner configuration and radially outer generally annular portion of the same material formed with a corrugated-like configuration or contour to thus provide uniformly-spaced doffing lugs, the corrugated-like lug portions of which are open at their outer terminals to assure the purging of foreign material radially from the outer periphery while rotating.

Yet another object of the invention is to provide an improved doffer of generally uniform wall thickness, homogeneous undulated or corrugated-like sheet construction in cross-section, preferably of rubber-like, plastic-like, or elastomeric material, of low-cost construction, which may be economically discarded when worn and avoiding economic disadvantage of extra handling and replacing of the worn protuberant doffer elements.

Further objects, advantages and uses will appear as the preferred embodiments of the invention are described and set forth in the accompanying drawings, wherein:

FIG. 3 is a fragmentary top view of the doffer, taken on the line 3—3 of FIG. 1, looking in the direction of the arrows;

FIG. 4 is a fragmentary sectional view through one of the reinforcing ribs, on the line 4—4 of FIG. 2, in the direction of the arrows;

FIG. 5 is a fragmentary bottom view of another form of doffer similar to that shown in FIGS. 1 to 4, but with the crests or doffing surfaces of the lugs or corrugations roughened or knurled with protuberant teeth-like elements for enhanced grip or resistance to slippage;

FIG. 6 is a fragmentary side view taken along the line 6—6 of FIG. 5, in the direction of the arrows;

FIG. 10 is a side view, partly in section, of still another form of the invention, taken along the line 10—10 of FIG. 11, looking in the direction of the arrows;

FIG. 11 is a bottom view, taken on the line 11—11 of FIG. 10, looking in the direction of the arrows, a portion of the hub being broken away; and FIG. 12 is a top view of the hub, taken on the line 12—12 of FIG. 10, looking in the direction of the arrows.

Figure 1:
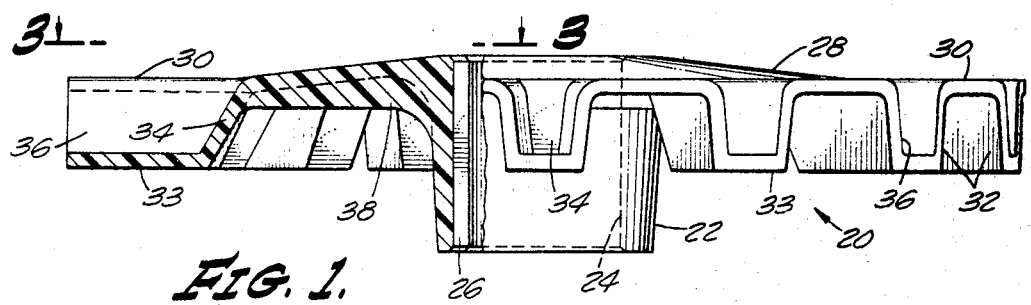
FIG. 1 is a side view, partly in section, of one form of doffer in accordance with the invention, taken on the line 1—1 of FIG. 2, and looking in the direction of the arrows.

Briefly, the invention relates to an apparatus for removing cotton fibres from the picker spindles of a cotton harvester including a generally plate-shaped or planar web of unitary, homogeneous construction, the outer annular periphery being radially corrugated or undulated to provide doffing lugs with adequate resistance to grab the cotton and resilience for axial flexing to preclude breaking, the lugs open at their outer peripheral ends for expulsion of dirt and other foreign material on rotation; and a central, hollow, cylindrical hub coaxial with the disc.

Like reference characters in the various figures of the drawings and in the following detailed descriptions designate corresponding parts.

One form of doffer in accordance with the invention is shown in FIGS. 1 to 4, inclusive.

Figure 2:
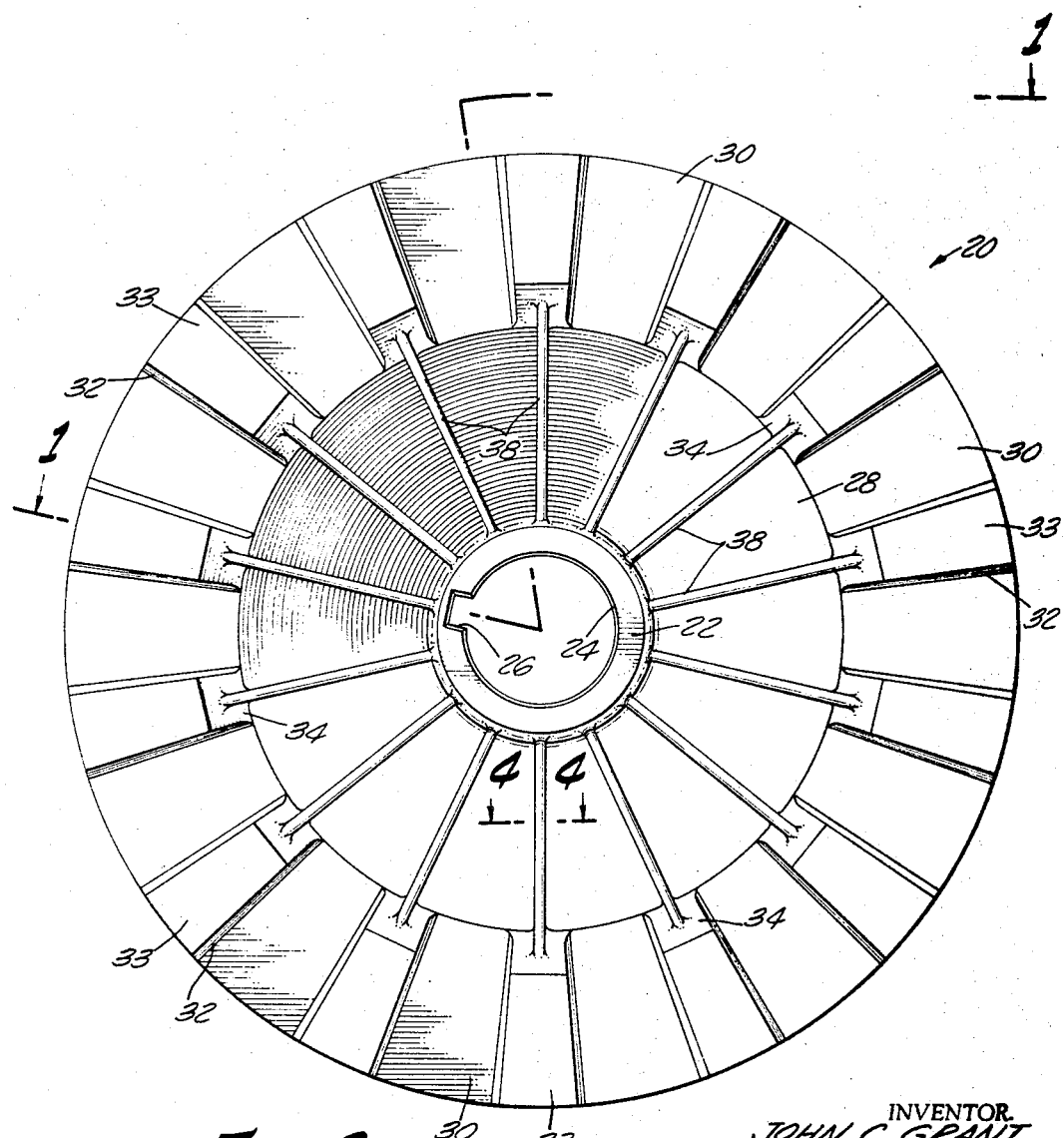
FIG. 2 is a bottom view of the doffer shown in FIG. 1.

Referring to FIGS. 1 and 2, there is shown a unitary doffer 20 of a uniform material, that is, with all parts formed of the same material; hub 22 having a central opening 24 accommodating a shaft and a keyway 26 for keying the hub to a shaft (not shown). The annular, generally disc-shape portion of the doffer 20 includes a relatively flat or disc-like smooth radially inner portion 28 and a radially outer portion 30 having an undulated or corrugated-like shape or contour circumferentially. The unit is molded or formed to provide characterizing corrugations or undulations defining hollow lugs or crests 32 with inner closed terminals 34, outer open terminals 36 and relatively flat doffing surfaces 33. The inner annular web 28 may be reinforced by radially extending integrally molded ribs 38 extending from the inner or closed ends 34 of the lugs 32 to the central hub 22.

FIG. 3 shows the radial undulations or corrugations 32 extending below the surface of the outer annular web 30, having an open terminal 36 at the outer periphery of the web, and generally axially extending closed terminals 34 blending in with the inner radially extending annular web 28.

In FIG. 4 is shown a view looking radially outward toward the closed terminal 34 of a lug or corrugation 32, with the reinforcing rib 38 and inner annular web 28 blending into the lug 32.

Another form of the doffer of this invention is shown in FIGS. 5 and 6, the crests or cotton-engaging surfaces 37 of the corrugations 32 being formed to provide roughened or knurled teeth 37a for increased friction.

Figure 7:
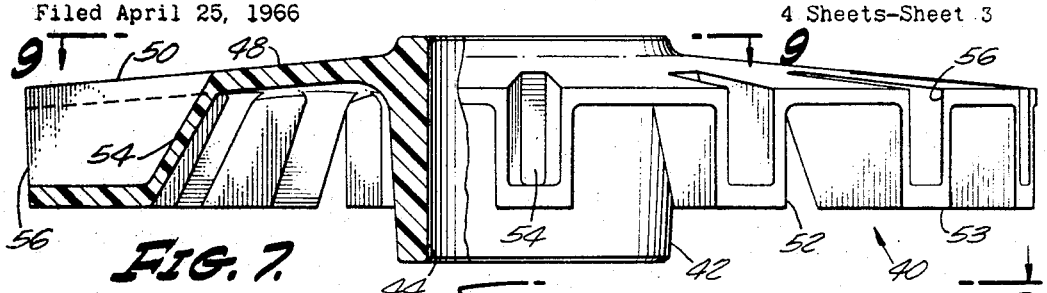
FIG. 7 is a side view, partly in section, of another modification of the invention, taken on the line 7—7 of FIG. 8, looking in the direction of the arrows.
Figure 8:
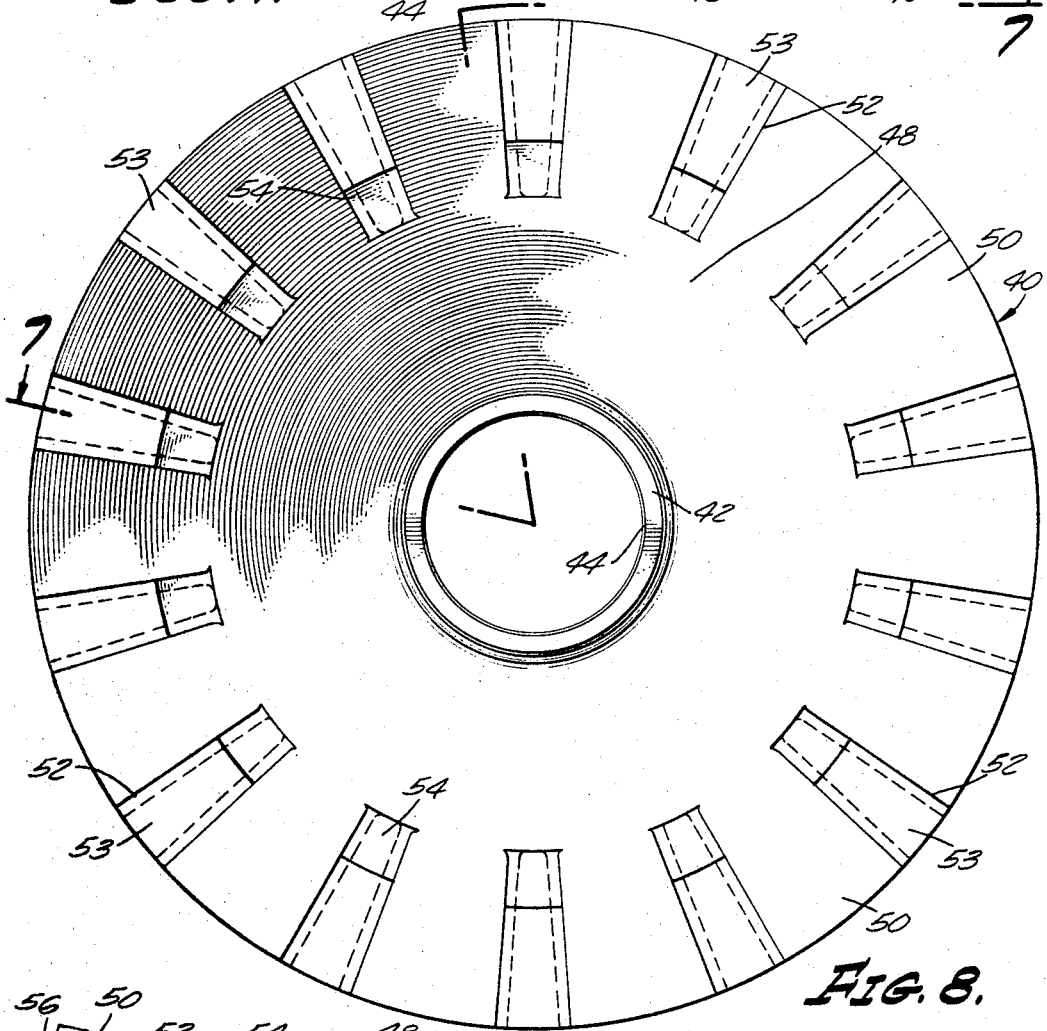
FIG. 8 is a bottom view of the modified version of the doffer shown in FIG. 7.
Figure 9:
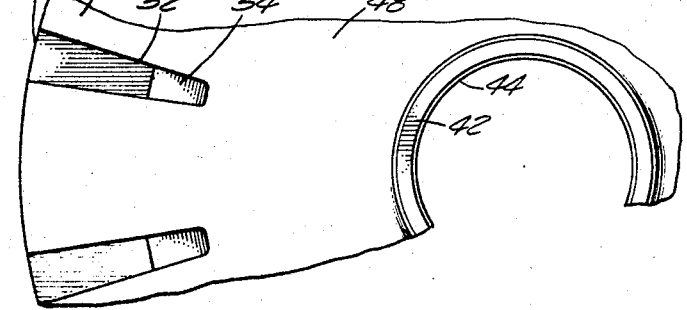
FIG. 9 is a fragmentary top view, taken on the line 9—9 of FIG. 7, looking in the direction of the arrows.

An additional modified form of doffer in accordance with this invention is shown in FIGS. 7 to 9, inclusive.

Referring to FIGS. 7 and 8, there is shown the doffer shaft. The annular, generally plate- or disc-shape, sheet portion of the doffer 40 has an inner, smooth portion 48 and an outer corrugated portion 50, the corrugations or undulations forming lugs 52 with an inner closed terminal 54, an outer open terminal 56, and a doffing or cotton-engaging surface 53.

Referring now to FIG. 9, the radial corrugations 52 are shown extending below the surface of the outer annular sheet-like portion 50, and having the open end 56 at the outer periphery of the web, and the closed end 54 blending in with the inner annular web 48.

Still another modified form of doffer in accordance with the invention is shown in FIGS. 10 to 12, inclusive.

Referring to FIGS. 10, 11 and 12, there is shown the doffer 60 with its hub member 62 and disc member 67. The hub 62 has a central opening 64 to accommodate a shaft, an annular groove 65 at one end to accommodate the inner peripheral edge 71 of the disc 67, and keyways 66 extending downward from the annular groove 65 adapted to receive as keys the reinforcing rib portions 78 of the disc member 67. The annular, generally plate-shape disc 67 has an inner, smooth portion 68 and an outer corrugated portion 70, the corrugations forming lugs 72 with an inner closed end 74, an outer open end 76, and a doffing surface 73. The inner annular web 68 is reinforced by the aforementioned ribs 78, which extend radially from the inner or closed ends 74 of the corrugations or lugs 72 to the inner periphery 71 of the disc 67.

In a typical application of a doffer of this invention for doffing cotton from the picking spindles of a cotton harvester, a stack of doffers, generally twenty of them, is mounted and clamped onto a power-driven vertical rotatable shaft, the principal axis of the doffers in line with the axis of the shaft. Referring to the first embodiment of the invention shown in FIGS. 1 to 4 and described above, the doffers 20 are fitted over the vertical shaft, the central opening 24 engaging the shaft, and the undulating corrugations or lugs 32 facing downward. In the operating position of the harvester, one of these stacks or drums is on each side of the row of cotton to be picked. Adjacent each stack of doffers is a corresponding stack of picker spindles or fingers, rotatable on their axes and in a plane to bring a row of them under each doffer 20 just below the lugs 32. As the harvester moves, the spindles travel in toward the cotton to stab the bolls, the cotton winding around the barbed spindle. As the latter moves on around in its horizontal plane of travel under the doffing surface 33 of the lugs 32, the surface speed of the doffing surface 33 being faster than that of the spindle, the cotton fibres are thereby unwound or doffed from the spindle by the doffer 20 and allowed to be drawn into a collecting hopper. The clearance between the picker spindles and the doffing surfaces 33 being relatively small, when sticks, rocks, green cotton bolls, or other tough objects get in between, and the spindles being rigid and of metal, the doffer 20 must be resilient and flexible enough to avoid breaking. To assure adequate stiffness for retention of shape and effective doffing, the web portion 28 may be reinforced with integral ribs 38. The terminal ends 36 of the doffing lugs 32 are open so that dirt and other debris will be flung out as the doffers are rotating. As the doffing surfaces 33 of the corrugations 32 wear with use, the doffers 20 may be replaced in the field, since they are of a low-cost construction, rather than being sent in for renovation. The doffing corrugations 32 may have roughened or knurled crests or doffng surfaces 37 for increased friction and grabbing power as in the form of the invention illustrated in FIGS. 5 and 6.

The application of the embodiment of the invention described above and shown in FIGS. 5 and 6, and also the form embodied in FIGS. 7 to 9 inclusive, would be similar to that described above for the doffers 20 of the first described embodiment of FIGS. 1 to 4.

In a typical application of the embodiment of the invention of FIGS. 10 to 12 inclusive, the doffers 60, including their hubs 62 and discs 67, may be pre-assembled and handled as described above for the doffers 20 of the form illustrated in FIGS. 1 to 4, the inner periphery 71 of the disc 67 engaging the annular groove 65 and the inner ends of the ribs 78 engaging the keyways 66 of the hub 62. Operation is then the same as that described above for the doffers 20 and 40 of the forms embodied in FIGS. 1 to 4, FIGS. 5 and 6, and FIGS. 7 to 9, except for replacement after the wearing surfaces 73 of the corrugations 72 are worn out. At that time, only the disc 67 need be replaced, the hubs 62 being re-usable, since they are of die-cast metal or equivalent material and get little wear.

The doffers of the forms embodied in FIGS. 1 to 4 and in FIGS. 5 and 6, and FIGS. 7 to 9, and the disc portion of the form of FIGS. 10 to 12 of this invention may be produced by the usual molding procedures familiar to those skilled in the art of plastic and elastomeric technology, the parts being molded of generally uniform cross-section for good quality and properties, of unitary, homogeneous construction of plastic, elastomeric, or plastic-elastomeric blend, a composition being selected which has good abrasion resistance, structural, flex, and impact strength, and stable properties under normal operating conditions, including a temperature range of approximately 20° F. to 150° F. One of such materials employed in practicing the present invention is commercially available under the trade name "Lexan," a poly bisphenol A carbonate resin. Also applicable would be acetal resins, such as the material known to the trade as "Delrin," "Celcon," or other plastics, rubber-like materials, and blends with equivalent properties.

While four forms of the device have been shown by way of illustration and description, it should be understood that various modifications will occur to those skilled in the art. For example, referring to FIGS. 1 and 2, the lugs 32 could extend farther inward into the inner annular web 28 toward the hub portion 22; and, further, the web portion between the lugs 32 could be reduced in radial extent, the lugs 32 then serving as radial doffing fingers, the annular portion 30 being polydactyl or digitate. It should be understood, too, that although a few typical examples of doffer materials have been suggested, others which meet the physical and environmental requirements might also be substituted.

The doffer of the present unique construction and composition requires no internal reinforcement of a material of dissimilar character such as metal. Particular emphasis is placed on the fact that in the present improved construction the sheet-like walls of the protuberances defining a hollow space within each protuberance greatly facilitates and assures the effective operation of the cotton-engaging surfaces, in resistingly yielding to the action of the cotton in an optimum manner. This is clearly distinguishable in this important respect from solid rubber-like protuberances and from metal-reinforced cotton-engaging protuberances generally.

I claim:

1. In a cotton doffer having a principal axis of rotation and adapted for use in a cotton harvester having picker spindles and a power-driven doffer-supporting shaft, said doffer being adapted for rotatably contacting and removing cotton from said picker spindles; said doffer comprising means forming a generally annular shaped disc composed substantially entirely of a unitary, rubber-like material adapted to be mounted on said shaft for driven rotation, said doffer being particularly characterized by being formed with radially extending peripherally located undulations or corrugations of sheet-like substantially uniform thickness in circumferential cross-section, and said corrugations being open at least at the outer terminals thereof, said undulations forming axially facing crests for contacting cotton, said undulated sheet-like construction functioning to facilitate yieldingly resisting movement of said cotton-engaging surfaces when engaging cotton.

2. The doffer structure as defined in claim 1, further particularly characterized by the formation of said crests in a manner to provide generally planar surfaces lying in a plane perpendicular to the principal axis of the doffer.

3. The doffer structure as defined in claim 1 wherein said crests are formed to provide planar surfaces lying in a plane perpendicular to the principal axis of the doffer, said surfaces being provided with a multiplicity of protuberant teethlike elements effective further to facilitate engagement with the cotton being acted upon.

4. The doffer structure as defined in claim 1 wherein said generally annular shaped disc consists of a smooth inner annular portion and an outer annular portion, said radially extending undulations or corrugations being confined to said outer annular portion.

5. The doffer structure as defined in claim 4 including radially extending ribs on said inner annular portion merging into said radially extending undulations or corrugations in said outer annular portion.

6. The doffer structure as defined in claim 5 wherein said generally annular shaped disc is adapted to be removably keyed to a hollow cylindrical hub, and said hollow cylindrical hub is adapted to be mounted on said power-driven, doffer-supporting shaft.

7. The doffer structure as defined in claim 6 wherein said hollow cylindrical hub has an axially extending keyway in its outer periphery, said keyway opening at one end of said hub, and said generally annular shaped disc having a key received in said keyway, said disc being slidable over one end of said hub to engage and disengage said key and said keyway.

8. The doffer structure as defined in claim 6 wherein said hollow cylindrical hub has a circumferential groove open at one end of said hub at its outer periphery, and a plurality of longitudinal keyways opening into said circumferential groove, and said generally annular shaped disc having a flange at its inner peripheral edge received in said circumferential groove and said radially extending ribs on said inner annular portion received in said longitudinal keyways.

References Cited

UNITED STATES PATENTS

| | | | |
|---|---|---|---|
| 2,619,784 | 12/1952 | Paradise | 56—41 |
| 2,654,202 | 10/1953 | Millard | 56—41 |
| 2,688,225 | 9/1954 | Morkoski et al. | 56—44 |
| 2,693,071 | 11/1954 | Parkerton | 56—41 |
| 2,729,930 | 1/1956 | Walker | 56—41 |
| 2,741,891 | 4/1956 | Knoth | 56—41 |
| 3,151,432 | 10/1964 | Sadler | 56—41 |
| 3,333,406 | 8/1967 | Parkerton | 56—41 |

RUSSELL R. KINSEY, *Primary Examiner.*

UNITED STATES PATENT OFFICE
CERTIFICATE OF CORRECTION

Patent No. 3,411,278                                                November 19, 1968

John C. Grant

It is certified that error appears in the above identified patent and that said Letters Patent are hereby corrected as shown below:

Column 3, line 27, after "doffer" insert -- 40, its hub 42 having a central opening 44 to accommodate a --.

Signed and sealed this 10th day of March 1970.

(SEAL)
Attest:

Edward M. Fletcher, Jr.                        WILLIAM E. SCHUYLER, JR.
Attesting Officer                                    Commissioner of Patents